Figure 1:
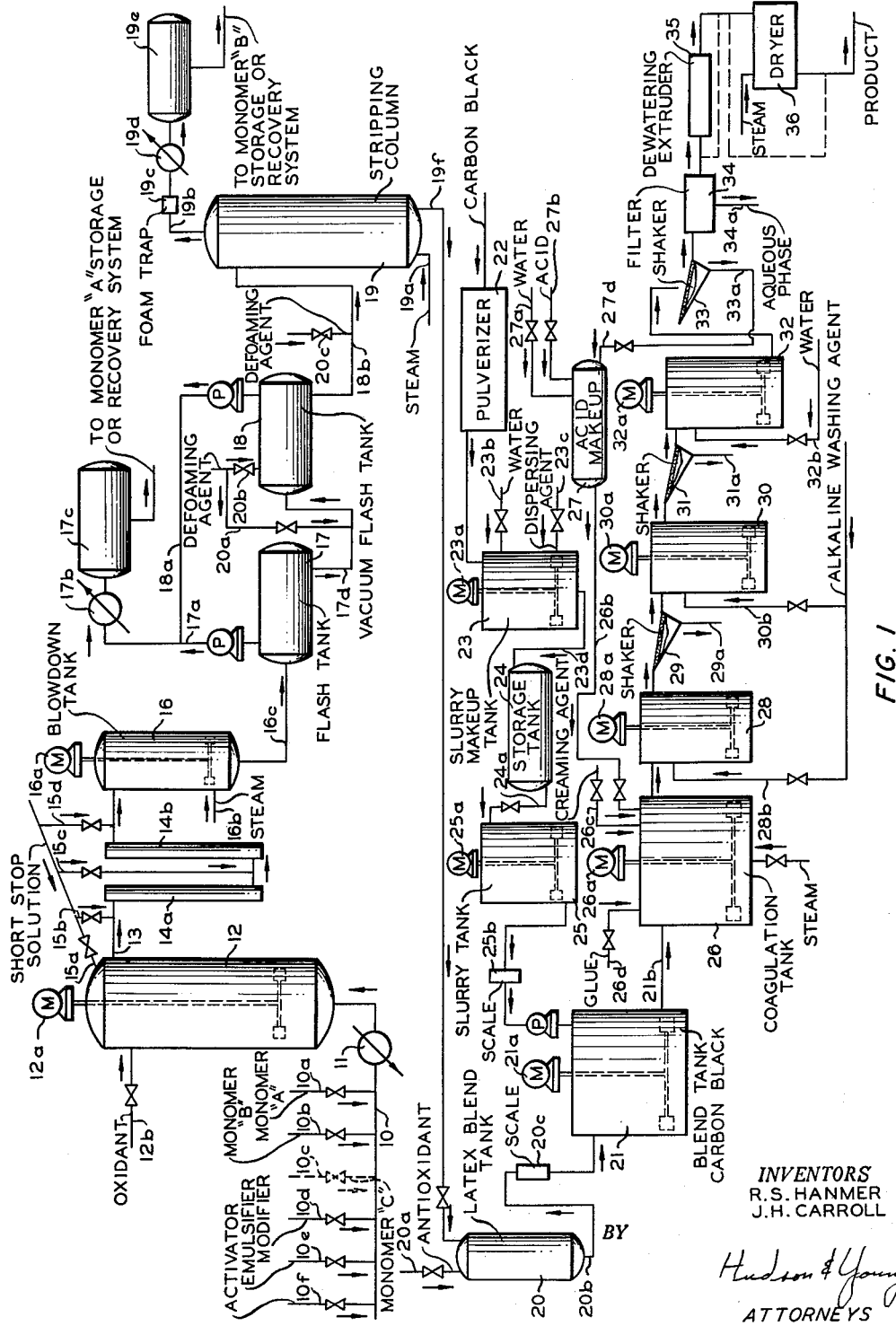

INVENTORS
R.S. HANMER
J.H. CARROLL

ATTORNEYS 3,035,006
METHOD OF PREPARING BUTADIENE POLYMER-CARBON BLACK MASTERBATCH
Robert S. Hanmer and James H. Carroll, Borger, Tex., assignors to Phillips Petroleum Company, a corporation of Delaware
Filed Nov. 22, 1954, Ser. No. 470,371
1 Claim. (Cl. 260—41.5)

This invention relates to a method of copolymerizing conjugated dienes and polymerizable heterocyclic nitrogen bases. In another aspect, it relates to a method of preparing compositions of carbon black and such copolymeric materials to provide a product having superior properties.

Copolymers of conjugated dienes and polymerizable heterocyclic nitrogen bases, either as such or with a third monomeric ingredient, have been found to have very superior properties as combustible binders in rocket propellant materials. When admixed with carbon black, the material is readily bonded to metals, has excellent wetting characteristics for ammonium nitrate, creates practically no smoke, has a superior burning rate, and possesses excellent physical properties. Moreover, such a material does not crystallize, event at temperatures as low as −40 to −100° F.

It is particularly important from processing and other standpoints that such products have a Mooney viscosity and carbon black content within prescribed limits. If the polymer which is admixed with the carbon black has a Mooney value of less than 5, the final product has a strength and elongation too low for satisfactory use in propellants. Additionally, the final product is too soft and sticky to process on a commercial scale. On the other hand, if the Mooney value is above 30, a propellant binder made from the material has high heat buildup, and an excessive amount of plasticizer is required to produce an acceptable product. Further, incorporation, with respect to the oxidizer, is unsatisfactory. Where the carbon black content is above 35 parts of carbon black per 100 parts of polymer, the propellant binder is too stiff to process satisfactorily and has an excessive extrusion pressure. Finally where said carbon black content is below 10 parts, the propellant product has poor dimensional stability, generates excessive smoke, and is subject to excessive creep. Thus, for the purposes stated, the polymer has a Mooney value between 5 and 30, a maximum carbon black content of 35 parts per 100 parts of polymer and a minimum carbon black content of 10 parts.

In addition, it is necessary that the final polymer-carbon black mixture have an ash content of less than 1.5%, an acid content of less than 1.5%, and a soap content of less than 1.0%. All percentages are percentages by weight unless otherwise indicated and ash, acid and soap contents are computed on a dry basis. For products of the highest quality, the acid content should be less than 1%, the soap content should be less than 0.5%, and there should be a minimum quantity of sodium salts in the product. Further, the moisture content of the polymer-carbon black mixture must be below 1.5%, and the proportions of conjugated diene and polymerizable heterocyclic nitrogen base are within defined limits. In particular, it is required that the conjugated diene be present in an amount of at least 50% of the total monomeric material. The heterocyclic nitrogen base can constitute between 5 and 50% of the total monomeric material, while the proportion of a third copolymerizable monomer can range from 0 to 45%.

The manufacture of materials meeting these rigid and difficult specifications is beset with many difficulties. We have discovered novel combinations of process steps to produce a product meeting the foregoing rigid specifications. In particular, we have discovered that a polymerization system employing, as part of the activator system, an alkali metal sulfoxylate formaldehyde produces the aforesaid copolymeric materials at very rapid conversion rates, and with substantial absence of precoagulation or prefloc in the polymerization process. The iron content of this recipe can be very low, resulting in a product with superior aging characteristics, and no "booster" of activator solution is required during the polymerization run.

We have also discovered controlled conditions of latex blending, coagulation, and washing which produce mixtures of carbon black and polymeric material meeting the aforementioned requirements of the product. Among the most important of these process steps are the maintenance of a pH of 1.5 to 3.5 in the coagulation zone, and the use of an alkaline material to wash the coagulum, this washing step being carried out under controlled conditions of time, concentration of reactants, pH and temperature so as to provide a product free from soap, ash and acid within the prescribed tolerance limits.

Further, we have discovered that the production of large amounts of material can be expedited by including, in the combination, an extrusion drying step following the alkaline washing of the coagulated material. Finally, we have discovered polymerization conditions such that the problem of waste and recovery of the heterocyclic nitrogen monomer is eliminated or substantially minimized.

Accordingly, it is an object of the invention to provide an improved method of making polymeric materials containing heterocyclic nitrogen bases.

It is a further object to provide a process for producing a mixture of such copolymeric materials with carbon black, this product meeting rigid specifications, particularly in the production of propellant materials.

Figure 2:
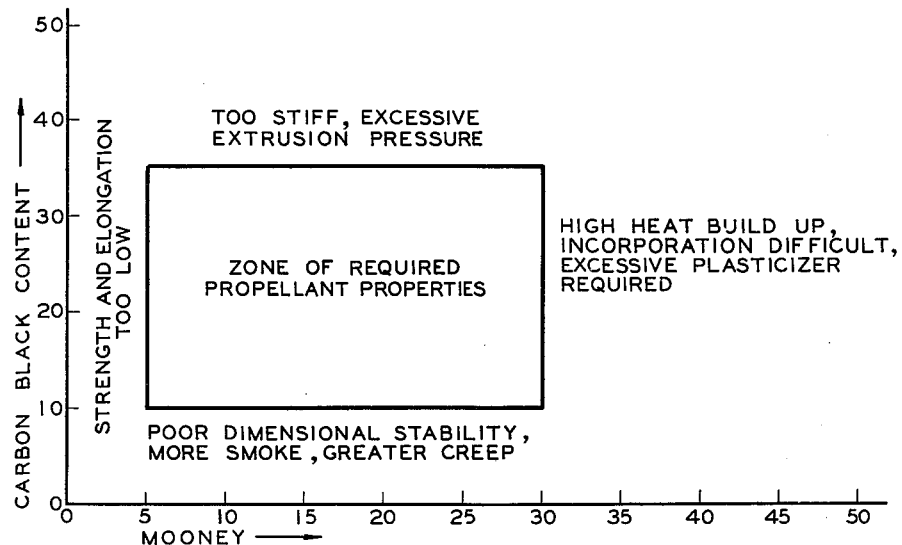
Figure 3:
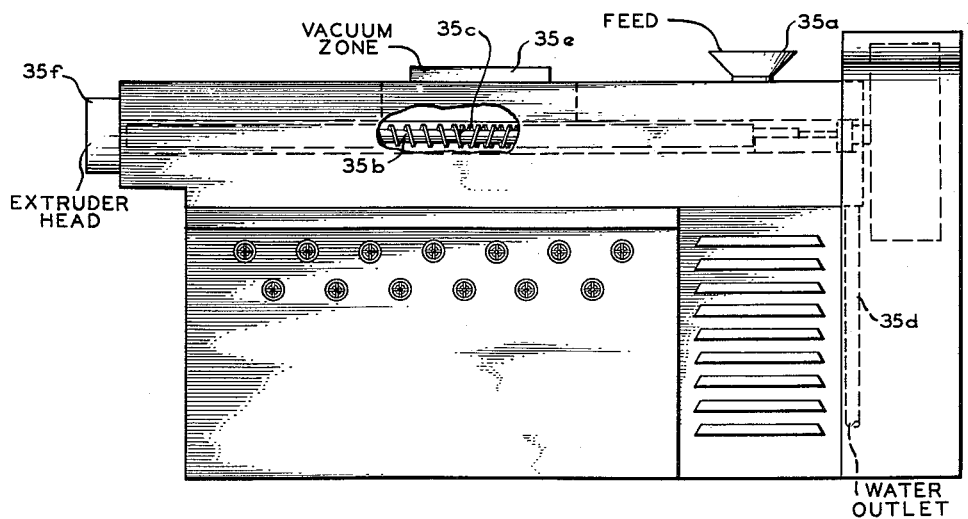

Various other objects, advantages and features of the invention will become apparent from the following detailed description taken in conjunction with the accompanying drawings, in which:

FIGURE 1 is a flow diagram illustrating the invention;
FIGURE 2 is a graph showing a feature of the invention; and
FIGURE 3 is a view of an extrusion drier.

In accordance with the invention, a conjugated diene and a heterocyclic nitrogen base are copolymerized in aqueous emulsion in the presence of an alkali metal formaldehyde sulfoxylate dihydrate ($NaHSO_2CH_2O.2H_2O$). Polymers produced by such polymerization or by other polymerization processes have, after separation of unreacted monomers, a Mooney value within the range of 15 to 30. The latex is coagulated at a pH within the range of 1.5 to 3.5 after being mixed with 10 to 35 parts of carbon black per 100 parts of rubber. The resulting coagulum is washed with alkaline material under controlled conditions of time, temperature and concentration of reactants, following which moisture is removed, most advantageously by an extrusion drier, and the dried material is packaged for shipment in polyethylene or other suitable containers.

Although, as previously indicated, we are the first, insofar as we are aware, to copolymerize conjugated dienes and heterocyclic nitrogen bases in an emulsion polymerization system activated by a soluble salt of sulfoxylate formaldehyde with resulting important advantages, in certain aspects of the invention, the polymeric material to be treated can be made with other polymerization recipes. For the guidance of those skilled in the art, the following typical recipes are presented together with preferred ranges for the various recipe constituents, examples being given both of the sulfoxylate recipe and of other recipes by which such polymeric materials can be produced.

RECIPE NO. 1

|  | Parts | Ranges |
|---|---|---|
| Water | 200 | 150 –300 |
| Butadiene | 90 | 75 – 95 |
| 2-Methyl-5-vinylpyridine [a] | 10 | 25 – 5 |
| Potassium fatty acid soap | 6.0 | 5 – 10 |
| KOH | 0.1 | 0 – 0.3 |
| KCl | 0.1 | 0 – 0.3 |
| Daxad 11 [1] | 0.3 | 0 – 3.0 |
| FeSO4.7H2O | 0.02 | 0.01– 0.1 |
| Sequestrene AA [2] | 0.04 | 0.01– 0.2 |
| Sodium formaldehyde sulfoxylate .2H2O | 0.10 | 0.02– 1.0 |
| Cumene hydroperoxide | 0.10 | 0.01– 0.5 |
| Tert-dodecyl mercaptan | 0.50 | 0.1 – 1.0 |
| Polymerization temperature, °F | 41 | –40–+100 |

RECIPE NO. 2

|  | Parts | Ranges |
|---|---|---|
| Water | 180 | 150 –300 |
| Butadiene | 90 | 75 – 95 |
| 2-methyl-5-vinylpyridine [a] | 10 | 25 – 5 |
| Potassium fatty acid soap | 6.0 | 5 – 10 |
| KOH | 0.1 | 0 – 0.3 |
| Daxad 11 [1] | 0.3 | 0 – 3.0 |
| Potassium persulfate | 0.3 | 0.1– 1.0 |
| Tert-dodecyl mercaptan | 0.5 | 0.1– 1.0 |
| Polymerization temperature, °F | 122 | 100–150 |

RECIPE NO. 3

|  | Parts | Ranges |
|---|---|---|
| Water | 180 | 150 –300 |
| Butadiene | 80 | 75 – 95 |
| 2-methyl-5-vinylpyridine [a] | 20 | 25 – 5 |
| Potassium oleate | 8.0 | 5 – 10 |
| Daxad 11 [1] | 0.3 | 0 – 3.0 |
| KCl | 0.1 | 0 – 0.3 |
| Sodium formaldehyde sulfoxylate.2H2O | 0.04 | 0.02– 1.0 |
| Sequestrene AA [2] | 0.04 | 0.01– 0.2 |
| FeSO4.7H2O | 0.02 | 0.01– 0.1 |
| Diisopropylbenzene hydroperoxide | 0.04 | 0.01– 0.5 |
| Tert-dodecyl mercaptan | 0.50 | 0.1 – 1.0 |
| Polymerization temperature, °F | 41 | –40–+100 |

RECIPE NO. 4

|  | Parts | Ranges |
|---|---|---|
| Butadiene | 90 | 75 – 95 |
| 2-methyl-5-vinylpyridine [a] | 10 | 25 – 5 |
| H2O | 180 | 150 –300 |
| Potassium fatty acid soap | 6.0 | 5.0 – 7.0 |
| KOH | 0.1 | 0 – 0.3 |
| Daxad 11 [1] | 0.3 | 0 – 3.0 |
| KCl | 0.1 | 0 – 0.3 |
| Potassium pyrophosphate | 0.33 | 0.28– 0.38 |
| Ferrous sulfate heptahydrate | 0.278 | 0.22– 0.32 |
| Diisopropylbenzene hydroperoxide | 0.213 | 0.16– 0.27 |
| Tert-dodecyl mercaptan | { [3] 0.50 / [5] 0.30 } | { [4] .1 – .8 / .1 – .4 } |
| Final raw Mooney (ML–4) | 20 | 15–25 |
| Polymerization temperature, °F | 41 | –40–+100 |
| Conversion, percent | 85 | 80–90 |

[a] May include 0.10% tert-butyl catechol.
[1] Sodium salt of condensed alkyl aryl sulfonic acid.
[2] Ethylenediamine tetraacetic acid.
[3] Initial.
[4] Sufficient mercaptan is used within these ranges to give the desired final raw Mooney value.
[5] At 55% conversion.

Parts given for materials other than monomers are parts by weight per 100 parts of monomers. When operating within the above ranges, the recipe should be balanced, as those skilled in the art will understand, to provide proper mol ratios of the activator constituents.

A booster including additional activator ingredients can be added if the reaction becomes slow before the desired conversion is reached.

From the foregoing recipes, it will be noted that the ingredients, in addition to the monomers include water, an emulsifying agent, a surface active ingredient such as Daxad 11, an electrolyte such as potassium chloride, and an activator composition including an oxidant, a metal salt capable of existing in two valence states, one or more additional activator ingredients, and a reaction modifier. It will further be noted that the surface active agent and/or electrolyte can be omitted in some recipes.

As those skilled in the art will understand, the conjugated dienes which can be employed are, in addition to butadiene, those which contain from four to eight, inclusive, carbon atoms per molecule and include 1,3-butadiene, isoprene (2-methyl-1,3-butadiene), piperylene, 2-methyl-1,3-pentadiene, 2,3-dimethyl-1,3-butadiene, chloroprene, and others. With a greater number of carbon atoms, the polymerization rate decreases somewhat, and there are so many isomers that it is not practical, with present procedures, to provide pure compounds. However, in a broader aspect of the invention, conjugated dienes having more than eight, such as twelve, carbon atoms per molecule can be used, particularly where the presence of various isomeric compounds can be tolerated. Furthermore, various alkoxy, such as methoxy and ethoxy, and cyano derivatives of these conjugated dienes, are also applicable. Thus, dienes, such as phenylbutadiene, 2,3-dimethyl-1,3-hexadiene, 2-methoxy-3-ethyl butadiene, 2-ethoxy-3-ethyl-1,3-hexadiene, 2-cyano-1,3-butadiene, and 2,3-diethyl-1,3-octadiene are applicable.

The polymerizable heterocyclic nitrogen bases which are applicable for the production of the polymeric materials are those of the pyridine and quinoline series which are copolymerizable with a conjugated diene and contain one and only one

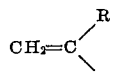

substituent wherein R is either hydrogen or a methyl group. That is, the substituent is either a vinyl or an alpha-methylvinyl (isopropenyl) group. Of these compounds, the pyridine derivatives are of the greatest interest commercially at present. Various substituted derivatives are also applicable but the total number of carbon atoms in the nuclear substituted groups, such as alkyl groups, should not be greater than 12 because the polymerization rate decreases somewhat with increasing size of the alkyl group. Compounds where the alkyl substituents are methyl and/or ethyl are available commercially.

These heterocyclic nitrogen bases have the formula

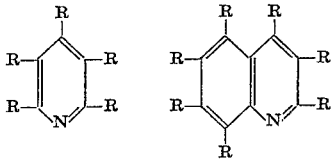

or

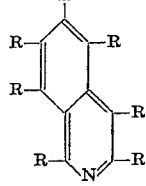

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 12. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2,4-dimethyl-5,6-dipentyl-3-vinylpyridine; 2-decyl-5-(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5 - phenylpyridine; 2 - (para-methylphenyl)-3-vinyl-4-methylpyridine; 3-vinyl-5-(hydroxyphenyl)pyridine; 2-vinylquinoline; 2-vinyl-4-ethylquinoline; 3-vinyl-6,7-di-n-propyl-quinoline; 2-methyl-4-nonyl-6-vinylquinoline; 4-(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

As indicated previously the copolymers can be prepared from mixtures of conjugated dienes and polymerizable heterocyclic nitrogen compounds or from mixtures of conjugated dienes, heterocyclic nitrogen compounds and certain other copolymerizable monomers. The latter monomers can include those containing an active

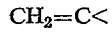

group such as aryl olefins, esters of acrylic and substituted acrylic acids, nitriles, amides, ketones, ethers, and halides. Specific examples of such copolymerizable monomers include various alkyl and substituted alkyl styrenes, 3-phenyl-3-butene-1-ol, p-chlorostyrene, p-methoxystyrene, alphamethyl-styrene, vinylnaphthalene, methyl acrylate, ethyl acrylate, methyl methacrylate, ethyl methacrylate, butyl methacrylate, methyl ethacrylate, acrylonitrile, methacrylonitrile, methacrylamide, methyl isopropenyl ketone, methyl vinyl ketone, methyl vinyl ether, vinyl acetate, vinyl chloride, vinylidene chloride, vinylfurane, vinylcarbazole, vinylacetylene, and the like.

The emulsifying agents employed in the emulsion polymerization systems of this invention include alkali metal alkyl aryl sulfonates such as sodium and potassium alkylbenzene and alkyltoluene sulfonates; sulfates of long-chain aliphatic alcohols such as sodium lauryl sulfates; water soluble salts of organic bases containing a hydrocarbon chain of 8 to 24 carbon atoms, e.g., hydrochloric, sulfonic, formic, and acetic acid salts of primary, secondary, and tertiary amines such as octylamines, dodecylamines, octadecylamines, and octadecenylamines; quaternary ammonium salts such as cetyl trimethyl ammonium bromides, and the like; the alkali metal and ammonium salts of fatty acids, such as potassium oleate, potassium stearate, potassium laurate, potassium myristate, potassium palmitate, the corresponding sodium salts and the like ammonium salts; the ammonium and alkali metal salts of rosin acids such as the ammonium, sodium, and potassium salts of abietic acid, dihydroabietic acid, and tetrahydroabietic acid; and non ionic emulsifying agents such as the condensation products of mercaptans with ethylene oxide and the like.

In addition to the activator compositions listed in the foregoing typical recipes, it will be understood, in the broader aspects of the invention, that various other systems can be utilized. Such systems comprise, in general, an oxidizing agent, such as an organic hydroperoxide, a complexing agent, such as potassium pyrophosphate, a heavy metal salt and, as an optional ingredient, a reducing sugar.

One widely used activator composition includes 0.01 to 0.5 part, per 100 parts of monomers of an organic hydroperoxide, 0.02 to 0.7 part of a salt of a heavy metal, such as iron, nickel, vanadium and the like, 0.03 to 0.7 part of an alkali metal pyrophosphate and 0.0 to 1.0 part of a reducing sugar, such as dextrose, glucose, mannose, levulose, and the like.

Other activating agents including diazothioethers having the formula R—N=N—S—R' where R and R' are aromatic groups containing substituents such as alkyl, chloro, nitro, methoxy, sulfonic acid group, and R' can also be cycloalkyl, substituted cycloalkyl, aliphatic and substituted aliphatic and the like. Another activator system comprises a peroxide or hydroperoxide and a polyalkylene polyamine.

Suitable hydroperoxide oxidizing agents for use in iron pyrophosphate (redox) recipes, polyalkylene polyamine recipes and other recipes calling for an oxygen-yielding material are organic hydroperoxides having the formula RR'R"COOH wherein each of R, R', and R" is an organic radical, or R'R" together comprise a tetramethylene or pentamethylene group forming with the R—COOH a cyclopentyl or cyclohexyl hydroperoxide. Each of R, R' and R" can be completely hydrocarbon in character, and can be mixed character, such as aralkyl, alkaryl, and the like, and can also have non-hydrocarbon substituents, some of which have the effect of making them more water-soluble and less oil (hydrocarbon)-soluble; particularly useful non-hydrocarbon substituents include oxygen in the form of hydroxy and ether groups, sulfur in similar groups (i.e., mercapto and thioether groups), and halogen atoms. Examples of such hydroperoxides include diisopropyl hydroperoxide (isopropyl-(dimethyl)hydroperoxymethane), cumene hydroperoxide (phenyl(dimethyl)hydroproxymethane), 1 - methyl - 1-hydroperoxycyclopentane, tetralin hydroperoxide, phenylcyclohexane hydroperoxide, octahydrophenanthrene hydroperoxide, diisopropylbenzene hydroperoxide (dimethyl(isopropylphenyl)hydroperoxymethane), methylethyl-(ethoxyphenyl)hydroperoxymethane, methyldecyl (methylphenyl)hydroproxymethane, dimethyldecylhydroperoxymethane, methyl(chlorophenyl)phenylhydroperoxymethane, and tertiary-butylisopropylbenzene hydroperoxide (dimethyl(tertiary-butylphenyl)hydroperoxymethane).

Any modifying agent known to the art can be used without departing from the scope of our invention. For example, sulfur containing compounds such as mercaptans, organic sulfides, thio and dithioic acids and salts, xanthogenic acids and salts, thiocarbamic acids and salts and the like, are suitable. The alkyl mercaptans are very suitable modifiers in emulsion systems and we have found the tertiary aliphatic $C_{12}$ to $C_{16}$ mercaptans of particular value, although mercaptans can be used which contain three to sixteen carbon atoms per molecule. Mixtures or blends of mercaptans can also be used.

The electrolyte, where used, is a water soluble salt such as an alkali metal chloride or an alkali metal phosphate. Suitable surface active agents are naphthalene sulfonic acid derivatives.

The polymerization temperature can vary from —40 to +150° F., an antifreeze agent, such as methanol, glycerol, erythritol, and ethylene glycol, being used where the temperature is below freezing. The pressure is sufficient to maintain liquid phase in the reactor, a typical pressure being 15 pounds per square inch gauge.

The amount of monomeric heterocyclic nitrogen compound can vary between 5 and 50% the product becoming resinous rather than rubbery in character where more than 50% of the heterocyclic compound is used. The conjugated diene is present in an amount of at least 50%, and monomeric material can contain up to 45% of additional copolymerizable monomers. In producing the propellant binder materials heretofore noted, no third monomeric ingredient is ordinarily used, and the monomers consist of 5 to 25 parts by weight of a polymerizable heterocyclic nitrogen base, particularly alkyl substituted monovinylpyridines together with 75 to 95 parts by weight of a conjugated diene having 4 to 8 carbon atoms, specifically butadiene.

The emulsifier is present in an amount of 3 to 10 parts by weight per 100 parts of monomers, and a decided improvement in latex stability is observed where the amount of emulsifier is maintained within the limits of 6 to 9 parts, there being no precoagulum in the blowdown tank following the reactor when the emulsifier is maintained in the aforesaid range of 6 to 9 parts, as compared with some deposit of precoagulum in the tank at lower emulsifier levels.

In general, the amount of oxidant varies within the range of 0.01 to 1.0 part by weight per 100 parts of monomers, the amount of heavy metal salt varies between 0.02 and 1.5 parts by weight per 100 parts of monomers, and the amount of pyrophosphate varies from 0.03 to 1.0 part by weight. As to optional ingredients, the surface active agent can be present in the amount of 0 to 3 parts by weight, the electrolyte in proportions of 0 to 0.3 part by weight, and the antifreeze is present in whatever amount is required to prevent freezing of the emulsion.

The amount of modifier is sufficient to provide a polymer with a raw or uncompounded Mooney value of 5 to 30. However, it will be understood that polymers having higher or lower Mooney values can be blended to a raw Mooney value of 5 to 30.

When utilizing the sulfoxylate recipe, an alkali metal sulfoxylate formaldehyde is present in the amount of 0.02 to 1.0 part by weight and a sequestering agent is present in the amount of 0.01 to 0.2 part by weight in addition to 0.01 to 0.5 part of an oxidizing agent, such as cumene hydroperoxide. It is an advantage of this recipe that the heavy metal salt content can be reduced to 0.01 to 0.1 part by weight. Particularly in the production of copolymers of butadiene and 2-methyl-5-vinylpyridine, the sulfoxylate recipe gives faster and more uniform conversion rates. Also no booster is required to give adequate conversion rates.

Also it has been found that the sulfoxylate recipe is capable of copolymerizing conjugated dienes and polymerizable heterocyclic nitrogen compounds even where the heterocyclic nitrogen base contains a polymerization inhibitor, such as 0.10% tertiarybutylcatechol. In general, the amount of inhibitor present in the heterocyclic nitrogen monomer varies between 0.001 and 0.5% by weight. However, to obtain effective polymerization and yet maintain a stable latex, it is important that the concentration of soluble polymer in the heterocyclic nitrogen monomer be kept below 2%.

As an optional feature of the recipes hereinbefore set forth, a methanol rinse of the valves and lines in the range of 0.10 part by weight per 100 parts of monomers can be used. This prevents formation of heterocyclic nitrogen base polymer in the charge valves and the piping of the system.

In preparing the aforementioned copolymers, the polymerization is carried out for a period, usually between 12 and 30 hours, sufficient to effect a conversion of from 50 to 100% of the monomeric materials. In commercial operations, it is important to maintain the conversion level within the range of 80 to 95%. At conversions of less than 80%, recovery of the large amount of unreacted heterocyclic nitrogen monomer is difficult and costly while conversions of greater than 95% require an excessive reaction time for commercial operations.

When the desired conversion has been attained, a shortstop material is added to stop the reaction. The amount of shortstop solution employed, usually in the range of 0.1 to 1.0 part per 100 parts of monomers, is sufficient to stop the reaction. Suitable shortstopping agents are ditertiarybutylhydroquinone, dinitrochlorobenzene, and a 50–50 mixture of sodium dimethyldithiocarbamate and sulfur in the form of sodium polysulfide or tertiarybutyl polysulfide.

It will be evident, therefore, that we have completely disclosed polymerization conditions for providing a copolymer of a conjugated diene and a heterocyclic nitrogen base, with or without the presence of a third monomeric ingredient copolymerizable therewith. Further, we have shown that the sulfoxylate recipe has unique and important advantages in carrying out this polymerization.

In a commercial operation, as shown by FIGURE 1, the conjugated diene (monomer A), the heterocyclic nitrogen base (monomer B), and the third ingredient (monomer C), if used, together with the modifier, emulsifier, and activator are fed to a charging line 10 through valved conduits 10a to 10f, respectively. From the charging line 10, the ingredients pass through a cooler 11 to a reaction vessel 12 provided with agitating mechanism 12a. The oxidant is fed to the vessel 12 through a valved conduit 12b.

In a continuous operation, the ingredients are fed continuously in proper proportions to the vessel 12 and withdrawn at a constant rate through an effluent conduit 13, it being understood that the reactor 12, in this instance, can consist of a plurality of vessels, such as vessel 12, connected in series or, alternatively, the reactor can consist of an elongated tube.

In a batch operation, the ingredients are charged to a single vessel 12 and maintained in this vessel until the desired conversion has been attained. It will be understood, of course, that the various ingredients are charged in the proportions already explained in detail to the vessel 12 and that a latex is withdrawn through line 13 containing the desired copolymeric material.

The effluent conduit 13 leads to a series 14a, 14b of elongated tubes, which are most useful in a continuous operation, to provide a continuation of the reaction zone. A shortstop solution, of the character and in the amount already described, is introduced through one of a plurality 15a to 15d of valved conduits either to the reaction vessel 12 or to the proper position in the series of tubes 14. The place at which the shortstop solution is introduced is determined by conversion conditions and, in a continuous operation, the shortstop solution is introduced at that location of the pipes 14 where the reaction has reached the desired conversion level. In a batch operation, the shortstop solution is charged to the vessel 12 at the completion of a reaction period sufficient to provide the desired conversion.

From the tubes 14, the shortstopped latex is admitted to a blowdown tank 16 provided with agitator mechanism 16a. Steam is introduced to the vessel 16 through a line 16b in an amount sufficient to raise the temperature of the shortstopped latex sufficiently to flash off the most volatile monomeric material. Where the copolymeric ingredients are butadiene and 2-methyl-5-vinylpyridine, the temperature is raised sufficiently to permit subsequent flashing of butadiene. The vessel 16 also functions as a surge tank.

From vessel 16, the latex is transferred by a line 16c to a flash tank 17 where monomer A is flashed off. Where monomer A is butadiene, suitable conditions for the flash tank are a temperature of 100 to 115° F. and a pressure of 3 to 5 pounds per square inch gauge. Monomer A is flashed overhead from the tank 17 and is pumped through a line 17a and a condenser 17b to an accumulator 17c from which the material is passed to storage, or to a recovery system as desired.

The latex is withdrawn from tank 17 and passed through a line 17d to a vacuum flash tank 18 where additional monomer A is flashed off. Where monomer A is butadiene, suitable conditions for the vacuum flash operation are a temperature of 100° F. and a pressure of 150 to 180 millimeters of mercury absolute. Monomer A flashed overhead in tank 18 is pumped through a line 18a to the condenser 17b and accumulator 17c. Latex is withdrawn from the tank 18 and passed through a conduit 18b to a stripping column 19.

It is important that a defoaming agent be introduced during the aforesaid flashing operation and, to this end, we have provided valved conduits 20a, 20b and 20c for introducing this defoaming agent. Usually, the defoaming agent is introduced in a sufficient quantity to control foaming at each of the three conduits 20, for example, in equal amounts in the range of 0.005 to 0.1% by weight of the latex, usually 0.01%. In this manner, foaming the resultant upsets in operation of the stripping column 19 are avoided.

Suitable antifoaming agents are the organo-silicon oxide condensation products described in Patent No. 2,416,504 (1947), and the methylpolysiloxanes described in Patent No. 2,595,928 (1952).

In the stripping column 19, steam is admitted through a conduit 19a in a quantity sufficient to maintain the desired stripping conditions. In this stripping column, the less volatile monomer is removed from the latex, for example, monomer B. Where monomer B is 2-methyl-5-vinylpyridine, suitable conditions for the stripping column are a top temperature of 100° F., a bottom temperature of 130° F. and a pressure of 50 millimeters of mercury absolute.

Monomer B is withdrawn overhead from the stripping column by a line 19b and passed through a foam trap 19c, a condenser 19d, and a storage tank 19e to a storage or recovery system for monomer B.

Where a third monomer, i.e., monomer C, is utilized it may be withdrawn either from the flash tanks 17, 18 or from the stripping column 19. In such cases, mixtures of monomers B and C and/or monomers A and C are separated by a suitable fractionation operation, and passed to their respective storage zones with further purification, as required.

Latex substantially free from unreacted monomers is withdrawn from the stripping column 19 by a line 19f and passed to one of a series of latex blend tanks, one of which is indicated by reference numeral 20. Each blend tank 20 is provided with a valved conduit 20a through which an antioxidant material is fed.

Suitable antioxidants for the practice of this invention include hydroquinone, monobenzyl ether, phenyl-beta-naphthylamine, polymerized trimethyldihydroquinoline, heptylated diphenylamine, the glyercol monoester of salicyclic acid, hexachloronaphthalene, poly diaryl amine, and hydrocarbon waxes. Other suitable antioxidants can be used without departing from the scope of the invention. The antioxidant is introduced in an amount sufficient to prevent decomposition of the polymer, usually in the range of 1 to 5 parts by weight per 100 parts of polymer.

Ordinarily, the stripped latex is stored in a tank 20, and then fed to the tank 21 where it is admixed with a carbon black slurry in the manner hereinafter described. In some cases, a plurality of latices are blended in a tank 20 to provide a material of the desired Mooney value (ML-4) within the range of 5 to 30. In commercial operation for producing propellant binders, the raw or uncompounded Mooney value of the polymer varies from 15 to 25 with an optimum value of 20.

Each blend tank 20 is connected by a line 20b and a scale 20c to a carbon black blend tank 21 provided with agitating mechanism 21a.

In the blend tank 21, the composite latex is admixed, in accordance with the invention, with a slurry containing carbon black, preferably of the medium abrasion furnace type. The amount of carbon black added in the slurry varies from 10 to 35 parts by weight per 100 parts by weight of the copolymeric material in the latex. When making propellant binder materials, a preferred range of carbon black content is from 15 to 30 parts of carbon black per 100 parts of copolymeric material. With smaller amount of carbon black, the dimensional stability of the binder is somewhat impaired, and with higher amounts of carbon black the binder is too stiff, and requires excessive extrusion pressure.

In making the carbon black slurry, the carbon black is introduced through a pulverizer 22 to a slurry makeup tank 23 provided with agitating mechanism 23a. Water and a dispersing agent are charged to the makeup tank 23 through lines 23b and 23c, respectively. Sufficient water is used to provide a 5 to 25 weight percent slurry of the black, for example, 900 parts by weight of water per 100 parts of carbon black. The slurry is maintained by a dispersing agent which is constituted of 0.1 to 0.5 part, preferably 0.27 part, of an alkaline material, such as potassium hydroxide, together with 0.1 to 5, preferably 2 parts of a surface acting agent, such as sodium lignin sulfonate.

The slurry is withdrawn from tank 23 by a line 23d and passed to a storage tank 24, from which it is withdrawn through a line 24a, as required, and passed to a slurry tank 25 provided with agitating mechanism 25a. From this vessel, the slurry passes through a scale or other metering device 25b and is pumped into the blend tank 21 in the proper amount to provide the aforementioned proportion of carbon black to copolymeric material.

From the blend tank 21, the mixture of carbon black slurry and latex, hereafter referred to as the masterbatch, is fed through a line 21b to a coagulation tank 26 provided with agitating mechanism 26a.

An acid stream is fed to the coagulation tank through a line 26b from an acid makeup tank 27 to which water, acid and serum are introduced through valved conduits 27a to 27d, respectively. The acid, which can be any strong mineral acid, such as sulfuric acid, is fed to the coagulation tank in an amount sufficient to maintain a pH within the range of 1.5 to 3.5. At lower pH values, the crumb produced in the coagulation step is too fine to permit proper filtration, and dewatering operations. Also, the heterocyclic nitrogen compound may form a stable salt. At higher pH values, the crumb is sticky, and difficult to handle in the subsequent processing steps. Also the serum is milky, indicating incomplete coagulation, and the filter screens downstream of the coagulation zone may be covered with a rubbery material. The amount of acid necessary to maintain this pH is usually between 0.1 and 0.5 pound of acid per pound of copolymer. Further, for commercial operations with butadiene and 2-methyl-5-vinylpyridine, an optimum selected pH range of 2.5 to 3.1 can be defined for providing material of adequate crumb size and proper processing characteristics.

Also introduced to the coagulation tank 26 as an optional procedure is a creaming agent which is fed through a valved conduit 26c. This creaming agent can be a brine, and is introduced in an amount within the range of 0.005 to 0.09 pound per pound of copolymer, an optimum quantity being 0.02 for the coagulation of a butadiene-2-methyl-5-vinylpyridine latex. Also, as an optional feature, glue can be added to the coagulation tank in an amount within the range of 0.005 to 0.1 pound per pound of polymer. This material is introduced through valved conduit 26d.

It is to be understood, that shock coagulation can be employed in treating the latices of this invention. This method involves rapid and abrupt contact of the polymer with the creaming agent (optional) and acid, as by introducing these materials as continuous streams into an agitated zone of relatively small dimensions.

In accordance with the invention, the masterbatch is coagulated in tank 26, and the crumb flows together with serum into a treating tank 28 where it is treated with an alkaline washing agent, such as potassium hydroxide, ammonia, ammonium or alkali metal carbonate, bicarbonate, or hydroxide. The function of this, and the subsequent washing step is to remove soap and acid from the masterbatch to meet the prescribed tolerance limits. The alkaline washing agent is employed as a 1 to 15% aqueous solution which is fed to the treating zone at a rate of 0.1 to 5 gallons per pound of polymer treated, and sufficient to maintain a pH of greater than 9 in the treating zone. In commercial operation, the pH within the treating zone is maintained within the range of 10.5 to 12.0, and the masterbatch is treated for 10 to 60 minutes at a temperature of 40 to 200° F. At higher treating temperatures, the time of treatment can be correspondingly reduced. A more specific treatment range for commercial operation with butadiene-2-methyl-5-vinylpyridine copolymers is a treatment time of 10 to 12 minutes at a temperature of 140 to 170° F. During the treating operation, agitation is maintained within the treatment zone by mechanism 28a, and the alkaline washing agent is introduced through a valved conduit 28b.

From the vessel 28, the crumb and serum pass to a shaker 29 where the crumb is separated from the serum, the latter being discarded through a line 29a. The crumb passes from the shaker 29 to a second treating vessel 30 provided with agitation mechanism 30a and supplied with alkaline washing agent through a valved conduit 30b. In the treating vessel 30, the crumb undergoes treatment with alkaline washing agent under the same conditions specified for treating vessel 28.

From the vessel 30, the treated crumb is withdrawn and passed to a shaker 31 from which liquid is withdrawn through a line 31a. The crumb is discharged from shaker 31 to a vessel 32 provided with agitation mechanism 32a and supplied with water through a valved conduit 32b. The amount of water is within the range of 0.5 to 5.0 gallons preferably 1 gallon per pound of polymer, and the temperature in this zone is maintained within the range of 100 to 160° F. In this step, any alkaline washing agent that may be present is washed from the polymer, and the ash content is somewhat improved.

The masterbatch product thus produced has an ash content less than 1.5%, an acid content less than 1.5%, and a soap content of less than 1.0% on a dry basis. Commercially, we have found that the described washing steps can be so regulated by operating within the aforesaid range that the product has an acid content below 1.0%, and a soap content below 0.5%.

Surprisingly, the product when mixed with ammonium nitrate and other propellant ingredients mixes with the other ingredients in a much shorter time than a product otherwise the same but washed with an acid instead of an alkaline treating agent. Also, as a result of the washing steps, the crumb is not sticky and can be readily dried in an extrusion dryer and more easily handled in plant and in conventional dryers.

From the treating vessel 32, the crumb passes to a screen shaker 33 and a filter 34 from which aqueous phase is withdrawn through lines 33a and 34a, respectively.

The filtered crumb is passed to storage through one or both of a dewatering extruder 35 and a tray drier 36.

A particularly advantageous operation is obtained when an extruder is used for the dewatering step. A suitable extruder for this purpose is shown in FIGURE 3 wherein it will be noted that the feed enters through a conduit 35a and passes in a longitudinal path through an area occupied by intermeshed screw conveyors 35b and 35c. Water squeezed out of the masterbatch particles is withdrawn through an outlet conduit 35d, and the material passing through the screw conveyors traverses a vacuum zone 35e in its longitudinal passage to an extruder head 35f from which the dried material is discharged. The pressure in the vacuum zone varies from 0.1 to 10.0 pounds per square inch gauge. In this manner, a moisture content of less than 1.5% or even less than 1.0% or as low as 0.2% can be obtained in a short period of time, i.e., in a period of 1 to 2 minutes. Thus, the product is quickly and efficiently dried with large throughput, and the black is very uniformly distributed through the polymer.

Where a longer processing time can be tolerated, the masterbatch can be dried by a tray unit 36 of more conventional type.

The dried polymer is then advantageously baled and packaged in polyethylene lined containers for its ultimate use as a propellant binder material, molding composition, brush-setting compound or potting composition.

It will be evident that we have achieved the objects of our invention in providing a method for producing products to the exacting specifications heretofore discussed. Thus, the latex blending step in combination with the polymerization step permits a copolymeric material to be readily produced having a Mooney value within the range of 5 to 30. Referring to FIGURE 2, it will be noted that the product has too low strength and too low elongation for use as a propellant binder, and it is too soft and sticky to process commercially where the Mooney value is less than 5. Further, the product has too high heat buildup for use as a propellant binder, excessive amounts of plasticizer are required, and incorporation of oxidant is difficult in making a propellant when the Mooney value is greater than 30. We have also provided steps for producing a masterbatch of such copolymers with carbon black in the range of 10 to 35 parts by weight of carbon black per 100 parts of polymeric material, it being noted from FIGURE 2 that the material is too stiff and requires excessive extrusion pressure for propellant purposes when the carbon black content exceeds 35 parts, and that the propellant has poor dimensional stability, excessive creep, and produces too much smoke where the carbon black content is less than 10 parts.

Also, as will be more fully shown hereinafter by the following data, we have found that the sulfoxylate recipe can be used, as described herein, to produce copolymers of conjugated dienes and heterocyclic nitrogen compounds at extremely high conversion rates with the use of minimum quantities of activator ingredients in the recipe. This has not only obvious economic advantages but also provides a polymer containing a very low portion of iron with resultant improvement, to an important degree, of its aging characteristics. In the novel finishing steps described herein for the masterbatch of copolymeric material and carbon black, a proper crumb size is produced by operating with a prescribed pH range in the coagulation step without at the same time, producing a sticky material which is difficult to process. The defined alkaline washing steps and water washing steps permit the product to be readily obtained with rigidly prescribed contents of ash, acid and soap but still within the required range of Mooney viscosity and carbon black content. Finally, the inclusion of the extrusion drying step in the combination permits the materials to be rapidly and efficiently dried at a maximum throughput with a sharp reduction in the amount of water-soluble non-volatile matter contained in the product, due to a large part of such non-volatile matter being removed with the expelled water. Further, the polymer composition is dried to a given moisture content much more rapidly than is possible when only a tray drier is employed.

The invention is further exemplified by the following illustrative examples of operations carried out according to the method of the invention.

*Example I*

A butadiene/2-methyl-5-vinylpyridine copolymer was prepared by emulsion polymerization at 41° F. in accordance with the following recipe:

| | Parts by weight |
|---|---|
| Water | 180 |
| Butadiene | 90 |
| 2-methyl-5-vinylpyridine [1] | 10 |
| Potassium fatty acid soap [2] | 6 |
| KOH | 0.1 |
| KCl | 0.1 |
| Daxad 11 [3] | 0.3 |
| $K_4P_2O_7$ | 0.33 |
| $FeSO_4 \cdot 7H_2O$ | 0.278 |
| Diisopropylbenzene hydroperoxide | 0.214 |
| Tert-dodecyl mercaptan | 0.45 |

BOOSTER RECIPE

| | |
|---|---|
| Water | 10 |
| $K_4P_2O_7$ | 0.165 |
| $FeSO_4 \cdot 7H_2O$ | 0.139 |
| Diisopropylbenzene hydroperoxide | 0.107 |
| Tert-dodecyl mercaptan | 0.45 |

[1] Inhibitor present, 0.07 weight percent tert-butylcatechol.
[2] Potassium Office Synthetic Rubber soap.
[3] Sodium salt of condensed alkyl aryl sulfonic acid.

The ingredients in the booster recipe were added when 60 percent conversion was reached. The reaction was continued to 88 percent conversion (total reaction time, 25.5 hours). The reaction was shortstopped with 0.15 part, per 100 parts of monomers charged, of Goodrite 3955 (50/50 mixture of sodium dimethyldithiocarbamate and sulfur in the form of sodium polysulfide) and 2 parts of phenyl-beta-naphthylamine, per 100 parts of polymer, was added as the antioxidant. After stripping, the coagulated polymer had a Mooney value (ML-4) of 23.

A carbon black slurry was prepared in accordance with the following recipe:

| | Parts by weight |
|---|---|
| Water | 900 |
| Carbon black (medium abrasion furnace black) | 100 |
| Marasperse CB (sodium lignin sulfonate) | 2 |
| KOH | 0.27 |

The butadiene/2-methyl-5-vinylpyridine latex was masterbatched with 20 parts by weight of carbon black per 100 parts rubber using the carbon black slurry prepared as described above. The masterbatch was coagulated by adding it to a sulfuric acid solution. The final pH of the serum was 2.5. The polymer crumb received two 45-minute caustic washes (with a 2 percent aqueous solution of potassium hydroxide) at a temperature of 160° F. and a pH of 10.0–11.0. It was then passed through a sausage grinder to remove a portion of the water. The material was then dried in a forced-convection tray drier for 8 hours at 160° F.

The finished masterbatch was analyzed for acid, soap and ash content, as well as carbon black loading. The following results were obtained:

| | |
|---|---|
| Mooney value (ML-4) of masterbatch | 34 |
| Acid, wt. percent (fatty acid) | 0.8 |
| Soap, wt. percent | 0.3 |
| Ash, wt. percent | 0.66 |
| Carbon black, wt. percent | 18.1 |

The above data show the production of mixtures of carbon black and a copolymer of butadiene and 2-methyl-5-vinylpyridine within the previously discussed ranges of Mooney viscosity and carbon black content in accordance with the principles of the invention to produce a product having an acid content of less than 1.5 percent, a soap content of less than 0.5 percent and an ash content of less than 1.0 percent.

*Example II*

Five thousand pounds of 90/10 butadiene-methylvinylpyridine copolymer masterbatched with 20 parts of carbon black was prepared.

The polymerization recipes were as follows:

| Component | Recipe A | Recipe B | Recipe C |
|---|---|---|---|
| Water | 200 | 200 | 200 |
| Butadiene | 90 | 90 | 90 |
| 2-methyl-5-vinylpyridine | 10 | [1] 10 | [1] 10 |
| Potassium fatty acid (OSR) soap | 6.0 | 6 | 6 |
| KOH | 0.1 | 0.1 | 0.1 |
| Sodium salt of condensed alkyl aryl sulfonic acid | 0.3 | 0.3 | 0.3 |
| KCl | 0.1 | 0.1 | 0.1 |
| Ethylene diamine tetraacetic acid | 0.04 | 0.03 | 0.04 |
| $FeSO_4 \cdot 7H_2O$ | 0.02 | 0.015 | 0.02 |
| Sodium formaldehyde sulfoxylate. $2H_2O$ | 0.10 | 0.075 | 0.1 |
| Cumene hydroperoxide | 0.10 | 0.075 | 0.1 |
| Tertiary dodecyl mercaptan increment [2] | Variable | Variable | 0.50 |
| | | Variable | 0.25 |
| Methanol rinse | 0.10 | 0.1 | 0.1 |
| Polymerization temperature, °F | 41 | 41 | 41 |
| Shortstop (50-50 mixture of sodium dimethyl-dithiocarbamate and sodium polysulfide) | 0.15 | 0.15 | 0.15 |
| Antioxidant (parts per 200 parts of rubber): Phenyl-beta-naphthylamine | 2.0 | 2.0 | 2.0 |

[1] Contained 0.01% tert-butylcatechol.
[2] Added at approximately 60 percent conversion.

POLYMERIZATION DATA

| Recipe-run | Soap solution pH | Time, hours | Conversion percent | Sulfole, total, part | Mooney (ML-4) stripped |
|---|---|---|---|---|---|
| A-1 | 11.8 | 25.7 | 85 | 0.75 | 28 |
| A-2 | 11.7 | 35.5 | 86 | 0.75 | 24 |
| A-3 | 11.9 | 10.1 | 83 | 0.75 | 13 |
| A-4 | 11.2 | 20.5 | 85 | 0.75 | 22 |
| A-5 | 11.3 | 14.9 | 82 | 0.75 | 13 |
| C-1 | 11.2 | 13.5 | 90 | 0.80 | 13 |
| B-1 | 11.0 | 22.7 | 84 | 0.75 | 14 |
| B-2 | 11.0 | 29.2 | 85 | 0.72 | 34 |

Polymers from these runs were blended as follows, to prepare blends having the Mooney values shown.

| Recipe-run | Blend I, percent | Blend II, percent |
|---|---|---|
| A-1 | 28 | 11 |
| A-2 | 32 | 12 |
| A-3 | 25 | 10 |
| A-4 | | 32 |
| A-5 | | 29 |
| C-1 | 3 | 1 |
| B-1 | 3 | 1 |
| B-2 | 9 | 4 |
| Blend Mooney (ML-4) | 25 | 19 |

The butadiene/2-methyl-5-vinylpyridine latex was masterbatched with 20 parts by weight of carbon black per 100 parts rubber using a carbon black slurry prepared as described in Example I. The masterbatch was coagulated by adding it to a sulfuric acid solution. The final pH of the serum was 2.5. The polymer crumb received two 45-minute caustic washes (with a 2 percent aqueous solution of potassium hydroxide) at a temperature of 160° F. and a pH of 10.0–11.0. A part of the material was then passed through a Buffalo grinder. This material was then dried in a forced-convection tray drier for eight hours at 160° F. The rest of the material was dried in the extrusion drier of the type shown by FIGURE 2.

The analysis of the material was as follows:

| Run number | Blend | Amount, pounds | Organic acid, percent | Organic soap, percent | Ash, percent | Carbon black parts by weight | Volatile matter, percent |
|---|---|---|---|---|---|---|---|
| 1 | I | 223 | 1.07 | 0.35 | 0.35 | 21.1 | 0.31 |
| 2 | I | 247 | 0.66 | 0.04 | 0.31 | 22.0 | 0.53 |
| 3 | I | 255 | 1.03 | 0.00 | 0.28 | 20.8 | 0.18 |
| 1 | II | 267 | 0.85 | 0.01 | 0.30 | 22.0 | 0.21 |
| 2 | II | 258 | 1.27 | 0.00 | 0.28 | 21.2 | 0.19 |
| 3 | II | 248 | 0.97 | 0.07 | 0.29 | 21.0 | 0.26 |
| 4 | II | 262 | 0.93 | 0.01 | 0.31 | 21.2 | 0.53 |
| 5 | II | 265 | 0.74 | 0.00 | 0.29 | 21.2 | 0.22 |
| 6 | II | 77 | 0.77 | 0.04 | 0.46 | 20.7 | 0.26 |

The above data show the production of mixtures of carbon black and a copolymer of butadiene and 2-methyl-5-vinylpyridine within the previously discussed ranges of Mooney viscosity and carbon black content in accordance with the principles of the invention to produce a product having an acid content of less than 1.5%, a soap content of less than 0.5% and an ash content of less than 1.0%.

*Example III*

Butadiene was copolymerized with 2-methyl-5-vinylpyridine in aqueous emulsion at 41° F. in accordance with the following polymerization recipes:

[Parts by weight]

|  | Recipe A | Recipe B |
| --- | --- | --- |
| Water | 180 | 200. |
| Butadiene | 90 | 90. |
| 2-methyl-5-vinylpyridine [1] | 10 | 10. |
| Potassium fatty acid soap [2] | 6 | 6. |
| KOH | 0.1 | 0.1. |
| Daxad 11 [3] | 0.3 | 0.3. |
| KCl | 0.1 | 0.25. |
| $K_4P_2O_7$ | 0.1 (0.3 millimole) |  |
| $FeSO_4 \cdot 7H_2O$ | 0.083 (0.3 millimole). | 0.013 (0.047 millimole). |
| Cumene hydroperoxide | 0.05 (0.33 millimole). | 0.065 (0.427 millimole). |
| Sequestrene AA [4] |  | 0.026. |
| Sodium formaldehyde sulfoxylate·$2H_2O$ |  | 0.10. |
| tert-Dodecyl mercaptan | 0.5 | 0.72.[5] |

Boosters for Recipe A (parts by weight)

|  | 1 | 2 |
| --- | --- | --- |
| tert-Dodecyl mercaptan |  | 0.3 |
| Water | 3 |  |
| $K_4P_2O_7$ | 0.05 (0.15 millimole) |  |
| $FeSO_4 \cdot 7H_2O$ | 0.042 (0.15 millimole) |  |
| Cumene hydroperoxide | 0.025 (0.165 millimole) |  |
| Time, hours | 24.3 | 26.3 |
| Conversion, percent when booster was added | 46 | 60 |

[1] No polymerization inhibitor present.
[2] Potassium office synthetic rubber soap.
[3] Sodium salt of condensed alkyl aryl sulfonic acid.
[4] Ethylenediamine tetraacetic acid.
[5] 0.48 part added in orginal charge, 0.24 part added at 60 percent conversion.

The run made according to Recipe A required 34.5 hours to reach 86 percent conversion, while that made according to Recipe B required 16.3 hours to reach the same conversion. Each run was shortstopped with 0.15 part, per 100 parts monomers charged, of Goodrite 3955 (50/50 mixture of sodium dimethyldithiocarbamate and sulfur in the form of sodium polysulfide) and 2 parts of phenyl-beta-naphthylamine, per 100 parts polymer, was added as the antioxidant. After stripping and coagulating, the polymer prepared according to Recipe A had a Mooney value (ML–4) of 18 and that prepared according to Recipe B had a Mooney value of 20.

It will be noted that the sulfoxylate Recipe B gave a substantially higher conversion rate than did Recipe A. Also, the amount of iron required was substantially reduced, and no activator booster was required for the increased conversion rate above 60 percent conversion.

*Example IV*

2-methyl-5-vinylpyridine containing a polymerization inhibitor (0.1 weight percent tert-butyl catechol and 0.025 weight percent o-aminophenol) was employed in two copolymerization runs with butadiene using two different 41° F. emulsion polymerization recipes, as follows:

[Parts by weight]

|  | Recipe A | Recipe B |
| --- | --- | --- |
| Water | 180 | 180. |
| Butadiene | 90 | 90. |
| 2-methyl-5-vinylpyridine | 10 | 10. |
| Potassium fatty acid soap [1] | 6 | 6. |
| KOH | 0.1 | 0.1 |
| KCl [1] | 0.1 | 0.1. |
| Daxad 11 [1] | 0.3 | 0.3. |
| $K_4P_2O_7$ | 0.33 (1 millimole) |  |
| $FeSO_4 \cdot 7H_2O$ | 0.278 (1 millimole). | 0.02 (0.072 millimole.) |
| Sequestrene AA [1] |  | 0.04. |
| Sodium formaldehyde sulfoxylate. $2H_2O$ |  | 0.10. |
| Diisopropylbenzene hydroperoxide | 0.213 (1.1 millimole). | 0.10 (0.52 millimole). |
| tert-Dodecyl mercaptan | 0.5 | 0.5. |
| Time, hours | 21.5 | 19.5. |
| Conversion, percent | 81 | 87. |

[1] As hereinbefore defined.

These data show that rapid polymerization is obtained even where the 2-methyl-5-vinylpyridine contains a polymerization inhibitor, and further demonstrates the superiority of the sulfoxylate Recipe B in that substantially less iron was required, and a substantially higher conversion was obtained in a shorter time.

*Example V*

Portions of masterbatches of carbon black and 2-methyl-5-vinylpyridine prepared in accordance with the process of the invention were dried (a) in an extrusion drier as shown in FIGURE 3, and (b) by passing the material in a through a Buffalo grinder, shredding the material in a hammer mill, and then placing the material in a tray drier.

The material leaving the Buffalo grinder had a moisture content of 10 to 12 percent, as compared with a moisture content of less than 1 percent for the material from the extrusion drier. A total processing time of 15 to 23 hours for a complete batch was required to dry the material to a moisture content of less than 1 percent by method (b) while the processing time for method (a) was less than 7 hours in all cases for a batch of the same size to produce a product having a moisture content of less than 1 percent.

*Example VI*

A latex of 90/10 butadiene/2-methyl-5-vinylpyridine copolymer, said polymer having a Mooney value of 23, was mixed with a carbon black slurry, the mixture containing 20 parts by weight of carbon black per 100 parts of polymer. The mixture was coagulated at a pH of 2.5 forming a crumb. One sample was given two washes with an alkaline treating agent, as described herein, and another sample of crumb was given two acid washes at a pH of 2.5 to 3.0 and two water washes.

On incorporating the two materials, after drying, in identical propellant compositions containing ammonium nitrate, the composition containing the caustic washed polymer crumb was much easier to mix than the composition containing the acid washed crumb, which was difficult to consolidate and required a much more rigorous mixing procedure.

The mixing time required from the beginning of addition of the ammonium nitrate to the time when it had all been incorporated was much shorter with the composition containing the caustic washed polymer crumb than with the composition containing the acid washed crumb.

These results clearly indicate the superiority of the treating process of this invention, as compared with treatment of the polymer crumb with acid washing media.

While the invention has been described in connection with present, preferred embodiments thereof, it is to be

We claim:

A method of producing a composition of polymeric material and carbon black which comprises blending latices produced by aqueous emulsion polymerization of monomeric material consisting of 5 to 25 parts of 2-methyl-5-vinylpyridine and 75 to 95 parts of butadiene per 100 parts total monomers, said polymerization being carried out to a conversion of at least 80% in the presence of 6 to 10 parts of a fatty acid soap as emulsifier, thereby to produce a blended latex containing copolymeric material having a Mooney value of 15 to 25, adding a slurry of carbon black to said latex to produce a mixture containing 15 to 30 parts of carbon black per 100 parts of copolymeric material in said latex, coagulating the resulting mixture in the presence of a brine and sufficient acid to maintain a pH within the range of 2.5 to 3.1, thereby forming a crumb, treating said crumb with an alkali metal hydroxide for a period of 10 to 60 minutes at a temperature of 40 to 200° F. and at a pH of 10.5 to 12.0, again treating the resulting material with an alkali metal hydroxide for a period of 10 to 60 minutes and at a temperature of 40 to 200° F. while maintaining a pH within the range of 10.5 to 12.0, and water washing and drying the thus treated material, thereby to produce a product having a moisture content of less than 1.5%, an ash content of less than 1.5%, an acid content of less than 1.0% and a soap content of less than 0.5%.

References Cited in the file of this patent

UNITED STATES PATENTS

| | | |
|---|---|---|
| 2,402,020 | Cislak et al. | June 11, 1946 |
| 2,419,512 | Vesce | Apr. 22, 1947 |
| 2,548,757 | Adams | Apr. 10, 1951 |
| 2,640,042 | Howland et al. | May 26, 1953 |
| 2,658,049 | Adams | Nov. 3, 1953 |

OTHER REFERENCES

Ind. and Eng. Chem., volume 43, No. 3, March 1951, pages 754–765 and 771–778.